United States Patent
Chang

(10) Patent No.: US 6,742,518 B2
(45) Date of Patent: Jun. 1, 2004

(54) RESPIRATOR FILTER

(76) Inventor: Wen-Tsung Chang, P.O. Box 82-144, Taipei (TW)

(*) Notice: Subject to any disclaimer, the term of this patent is extended or adjusted under 35 U.S.C. 154(b) by 108 days.

(21) Appl. No.: 10/109,697

(22) Filed: Apr. 1, 2002

(65) Prior Publication Data

US 2003/0183233 A1 Oct. 2, 2003

(51) Int. Cl.[7] .............................. A62B 23/02; A62B 7/10
(52) U.S. Cl. ........................ 128/205.29; 128/205.27; 55/DIG. 33; 55/DIG. 35
(58) Field of Search ................ 128/205.27, 205.29, 128/206.12, 206.19, 206.21; 55/DIG. 33, DIG. 35

(56) References Cited

U.S. PATENT DOCUMENTS

| 4,726,978 A | * | 2/1988 | Simpson | 428/198 |
|---|---|---|---|---|
| 4,883,052 A | * | 11/1989 | Weiss et al. | 128/205.27 |
| 5,186,165 A | * | 2/1993 | Swann | 128/201.28 |
| 5,315,987 A | * | 5/1994 | Swann | 128/201.28 |
| 5,394,867 A | * | 3/1995 | Swann | 128/201.25 |
| 5,900,305 A | * | 5/1999 | Chapman | 428/198 |

* cited by examiner

Primary Examiner—Aaron J. Lewis
Assistant Examiner—Joseph F Weiss, Jr.
(74) Attorney, Agent, or Firm—Leong C. Lei

(57) ABSTRACT

An improved structure of respirator filter comprised of a laminated layers of fireproof fabric, static fibers, active carbon fibers and non-woven filter cotton; interlaced with airflow guides in among the layers of the filter; a hole or multiple holes being respectively provided at the center or in the peripheral of another airflow guide so to create air conduction for increasing area and time for the gas to contact the filter for improved smoke and toxicity filtration effects.

1 Claim, 5 Drawing Sheets

RESPIRATOR FILTER

BACKGROUND OF THE INVENTION (a) Field of the Invention

The present invention is related to a structure of filter of a respirator, and more particularly, to one that improves smoke and toxicity filtration effects by increasing the area and time for gas to contact the filter.

(b) Description of the Prior Art

As illustrated in FIGS. 1 and 2 of the accompanying drawings, a respirator filter 1 generally available in the market is comprised of fireproof fabric, non-woven fabric and active carton fabric laminated in sequence to filter toxic gas passing through the filter 1 to prevent a person wearing the respirator from suffocation when trying to escape from a fire. Whereas, filter effect is significantly affected by the area of use and number of layer of the filter materials used, the effectiveness of the respirator filter in practical use is pending verification. However, as taught by theories, active carbon, chemical and catalyst are required to effect removal of hazardous gas. In a cartridge type of filter as illustrated in FIG. 2, it produces better filter effects than the laminated filter described above does. The primary cause is that the gas travels over a longer passage (8~15 cm) in the cartridge type of filter than the laminate filter does (0.8 cm). That is, it takes longer time for the gas to leave the cartridge. Usually when one wears a respirator, his respiration is drastically reduced to a fixed range, resulting in drastic deterioration of the filter effect. Accordingly, the laminated filter actually fails to achieve its purpose of safe protection.

SUMMARY OF THE INVENTION

The primary purpose of the present invention is to an improved respirator filter by extending the time the gas flowing through each layer of the filter to enhance filter effects.

To achieve the purpose, a lamination of the filter is provided containing layers of fire-proof fabric, static fibers, active carbon fibers and non-woven filter cotton interlaced with multiple airflow guides so that the gas inhaled creates internal and external circulation as directed by those guides to increase area and filter time for the gas to contact the filter, thus to improve smoke and toxicity filter effects.

The airflow guide is provided at its center a hole, or in its peripheral multiple holes so to allow the airflow to concentrate passing through the central hole or dissipate towards the peripheral of the airflow guide to create air conduction, thus to increase the length of filter time.

Finally, those airflow guides are interlaced provided among the layers of various filter materials the filter to create air conduction.

The foregoing object and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENT

The following descriptions are of exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Figure 1:
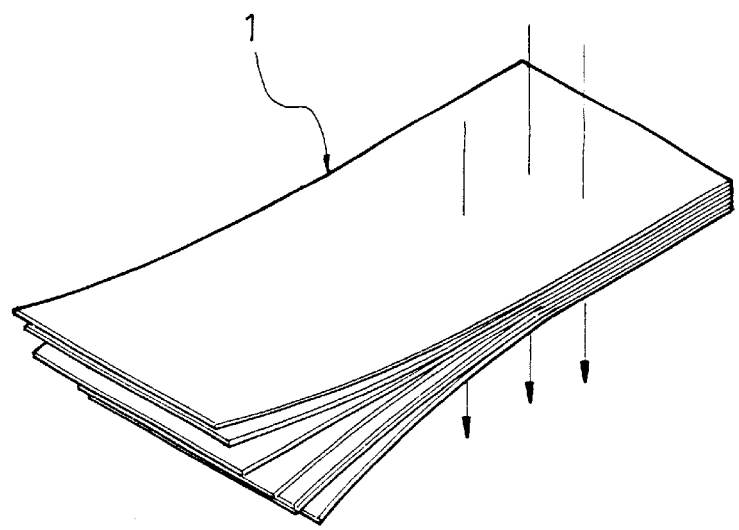
FIG. 1 is a schematic view showing a structure of a filter in the prior art.
Figure 2:
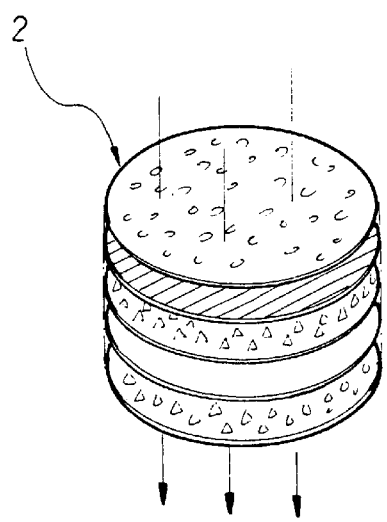
FIG. 2 is a schematic view of a filter cartridge of the prior art.
Figure 3:
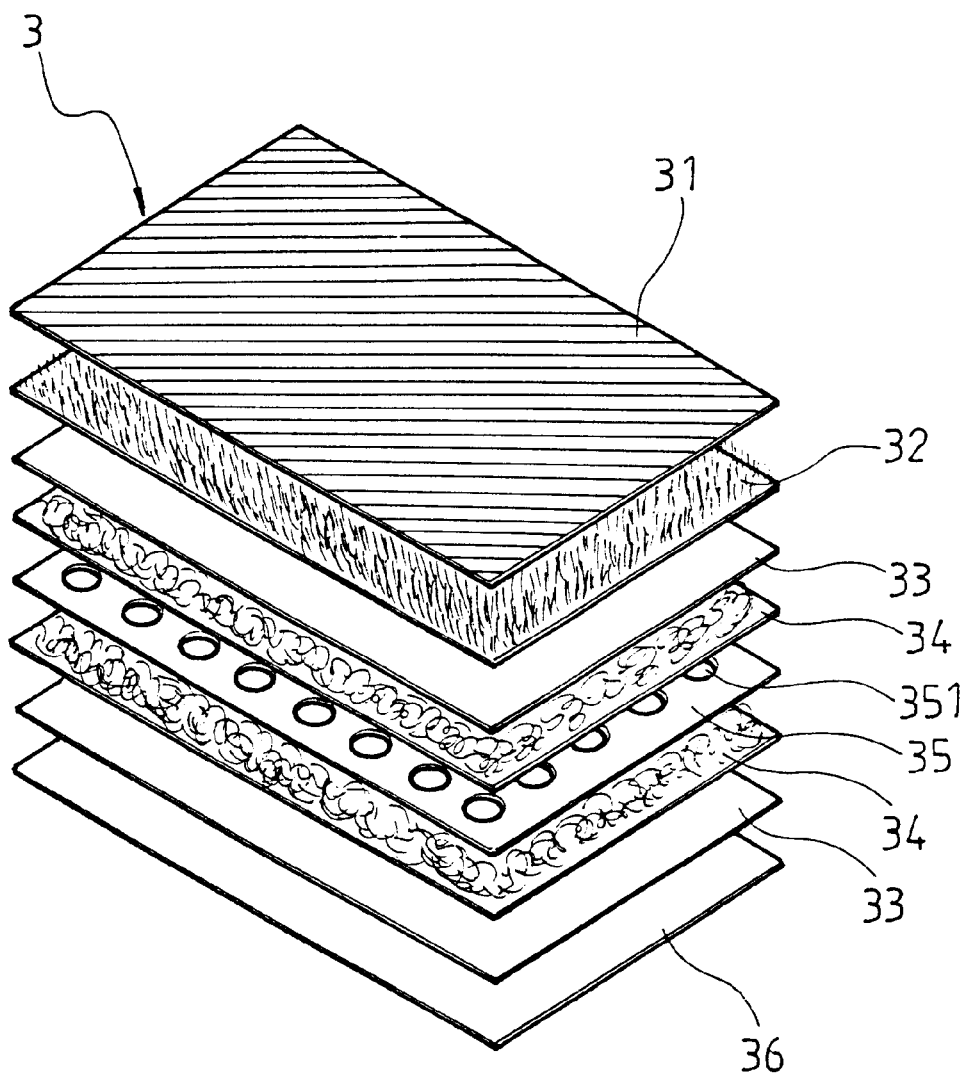
FIG. 3 is a schematic view of as assembly of a preferred embodiment of the present invention.
Figure 4:
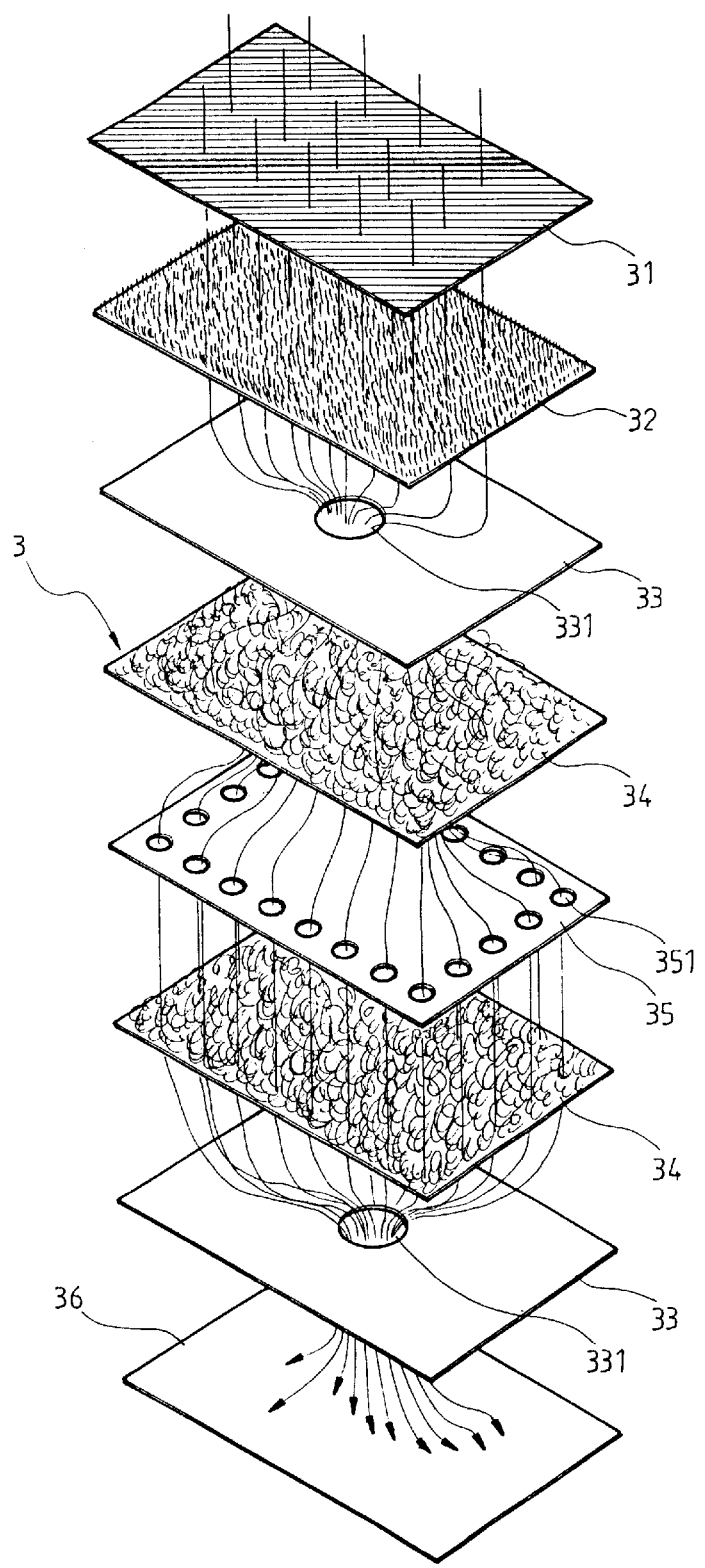
FIG. 4 is a schematic view showing the airflow of the preferred embodiment of the present invention.

Referring to FIGS. 3 and 4, a preferred embodiment of the present invention is comprised of layers of various materials laminated into one single filter. Within, the first layer relates to a fireproof fabric 31 (or any materials that stops temperature rising up to such extent unbearable by human being). The second layer relates to a static fiber 32 for absorption larger grains of smoke or dust. The third layer relates to an airflow guide 33 made of high-density film and having provided at its center a hole 331. The fourth layer relates to an active carbon fiber 34 (or other chemical or catalyst). The fifth layer relates to another airflow guide 35 also made of high-density film and arranged in its peripheral multiple holes 351. The sixth layer relates to another layer of active carbon fiber 34 (or other chemical or catalyst). The seventh layer relates to another airflow guide 33 made of high-density film and having provided at its center a hole 331. The eighth, also the last layer relates to non-woven filter cotton 36 to prevent irritation to one's throat or nose.

Figure 5:
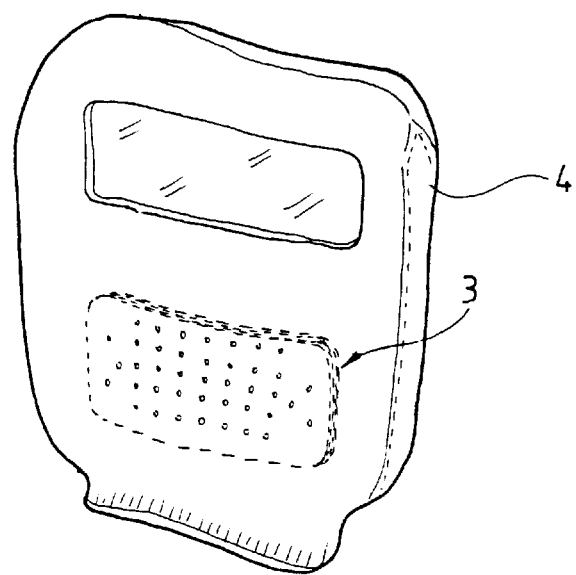
FIG. 5 is a schematic view showing that the preferred embodiment of the present invention is adapted to a respirator.

Now referring to FIG. 5, the laminated filter 1 is adapted to a respirator 4. Gas inhaled flows through each and all layers of the filter 1 and filtered. With the interlaced airflow guides 33 and 35, the gas concentrates to pass through the central hole 331 of the airflow guide 33 upon reaching the third layer and diffuses after passing through the central hole 331. As the gas passes through those multiple holes 351 provided in the peripheral of the airflow guide 35 and concentrates again after passing through another central hole 331 provided in the airflow guide of the seventh layer. Accordingly, the gas passing through each layer of the filter 1 forms internal and external circulation to create air conduction, thus to extend the length of filter time. That is, the time and area for the gas to contact the filter 1 to enhance smoke and toxicity filter effects for the respirator 4 to achieve precise and effective smoke proof.

Figure 7:
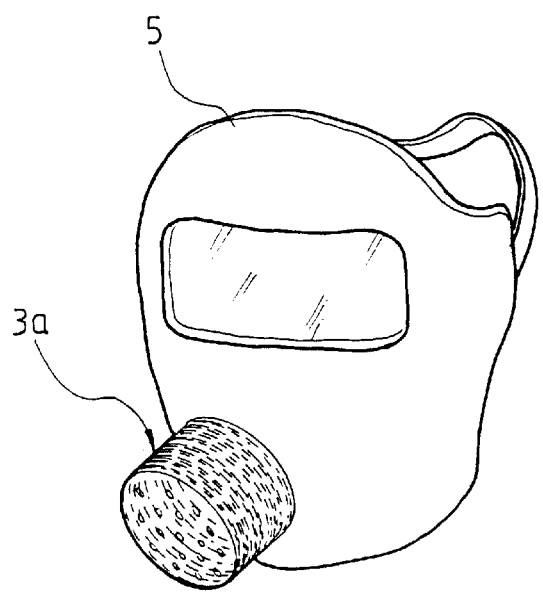
FIG. 7 is a schematic view showing that another preferred embodiment of the present invention is adapted to a respirator.
Figure 6:
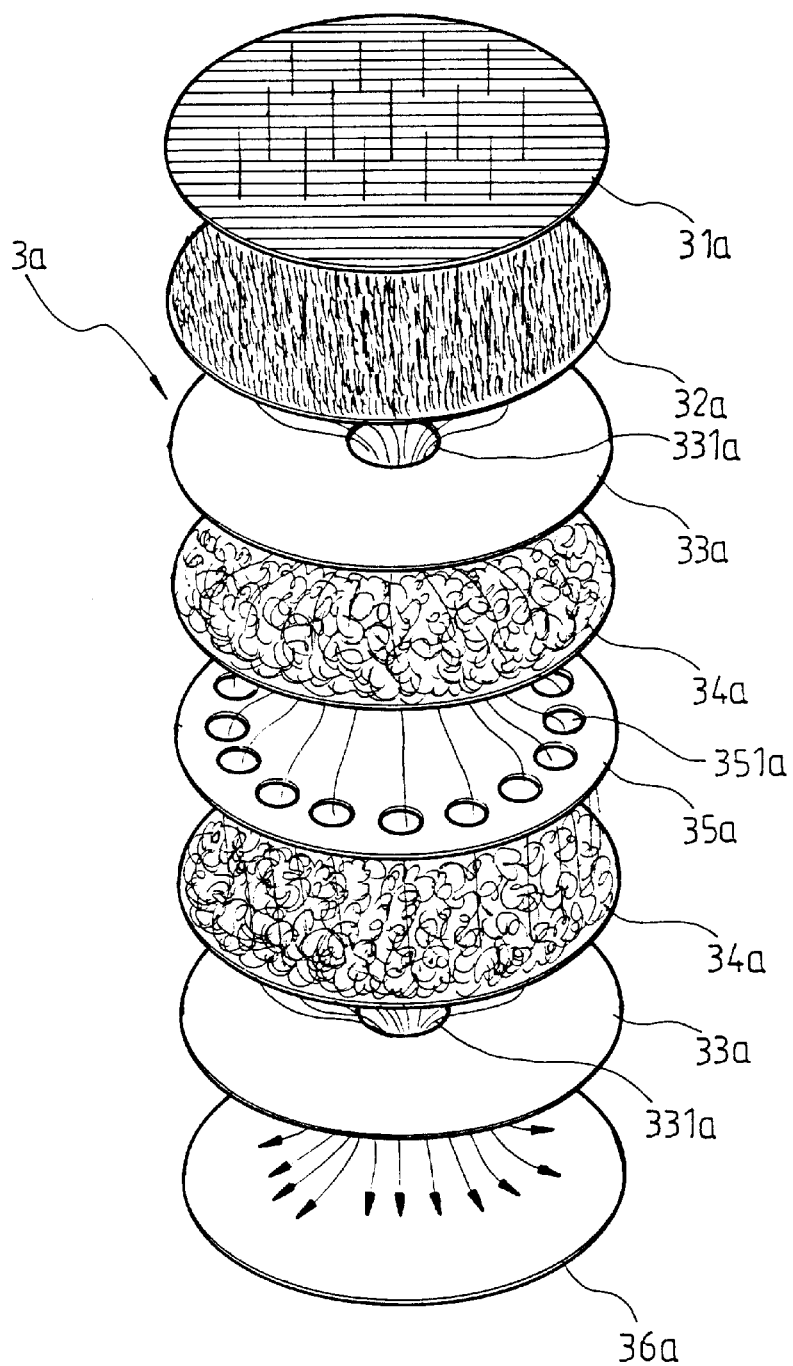
FIG. 6 is a schematic view showing an assembly of another preferred embodiment of the present invention.

As illustrated in FIGS. 6 and 7, the filter 1 of the prevent invention may be provided in a circular shape to be conveniently adapt to a cartridge type of respirator to achieve the same smoke and toxicity filter effects.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

I claim:

1. A structure of a respirator filter essentially consisting of a first layer of fireproof fabric, a second layer of static fiber mounted under said first layer; a third layer of a high density film mounted under said second layer and having a center hole, a fourth layer of active carbon fiber mounted under said third layer, a fifth layer made of high density film and having a plurality of peripheral holes, a sixth layer of active carbon fiber, a seventh layer made of high density film and having a center hole, and an eighth layer made of non-woven filter cotton.

* * * * *